United States Patent
Doi et al.

(10) Patent No.: US 6,763,427 B1
(45) Date of Patent: Jul. 13, 2004

(54) OPTIMIZING THE EXECUTION SEQUENCE IN A TAPE APPARATUS IN ORDER TO MINIMIZE TAPE TRAVELING DISTANCE

(75) Inventors: Koichi Doi, Kawasaki (JP); Yasuhiko Hanaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/343,119

(22) Filed: Jun. 29, 1999

(30) Foreign Application Priority Data

Aug. 3, 1998 (JP) .......................................... 10-218911

(51) Int. Cl.$^7$ .............................. G06F 13/00; G11B 5/78
(52) U.S. Cl. ...................... 711/111; 711/100; 711/154
(58) Field of Search .............................. 711/100, 111, 711/154, 170, 112; 360/134

(56) References Cited

U.S. PATENT DOCUMENTS

| | | | | |
|---|---|---|---|---|
| 3,812,532 A | * | 5/1974 | Crosser et al. | 360/72.3 |
| 4,423,480 A | * | 12/1983 | Bauer et al. | 710/100 |
| 4,428,064 A | * | 1/1984 | Hempy et al. | 711/113 |
| 4,638,424 A | * | 1/1987 | Beglin et al. | 711/117 |
| 4,750,107 A | * | 6/1988 | Buggert | 710/21 |
| 4,771,135 A | * | 9/1988 | Blaszczak | 540/360 |
| 4,858,039 A | * | 8/1989 | Mintzlaff | 360/72.2 |
| 5,398,142 A | * | 3/1995 | Davy | 360/48 |
| 5,455,926 A | * | 10/1995 | Keele et al. | 711/4 |
| 5,808,821 A | * | 9/1998 | Davy | 360/48 |
| 6,260,006 B1 | * | 7/2001 | Wong et al. | 703/27 |
| 6,349,356 B2 | * | 2/2002 | Basham et al. | 711/111 |

* cited by examiner

Primary Examiner—Tuan V. Thai
(74) Attorney, Agent, or Firm—Greer, Burns & Crain, Ltd.

(57) ABSTRACT

A tape apparatus increases throughput of data access requests by rearranging the sequence in which data access requests are processed in order to reduce repositioning of a tape medium. The tape apparatus includes a command queue for storing a plurality of instructions from a host apparatus, and a reordering mechanism for analyzing the stored instructions according to a predetermined set of rules. The sequence of the stored instructions are rearranged in order to minimize driving of the tape medium. The reordering mechanism can select N commands at a time from the head of the command queue, and determine a sequence for executing the N commands, yielding a minimum total driving distance of a medium tape from a current position of the tape medium.

8 Claims, 16 Drawing Sheets

| OFFSET | BIT 7 | BIT 6 | BIT 5 | BIT 4 | BIT 3 | BIT 2 | BIT 1 | BIT 0 |
|---|---|---|---|---|---|---|---|---|
| 00~03h | \multicolumn{8}{c}{FIXED} ||||||||
| 04h~05h | FORMAT INFORMATION |||||||| 
| 06h~07h | NO. OF RECORDS ||||||||
| 08h~0fh | UNUSED ||||||||
| 10h ~ 01FFh | UNUSED BLOCK MANAGEMENT BIT ||||||||
| 200h~203h | DATA START BLOCK ID — 114 ||||||||
| 204h~207h | DATA START TACHO VALUE — 115 ||||||||
| 208h~208h | DATA END BLOCK ID — 116 ||||||||
| 20Ch~20Fh | DATA END TACHO VALUE — 117 ||||||||
| 210h~213h | NO. OF DIVISIONS — 118 ||||||||
| 214h~27Fh | UNUSED ||||||||
| 28Dh~283h | START BLOCK VALUE OF FIRST SECTION — 114a ||||||||
| 284h~287h | START TACHO VALUE OF FIRST SECTION — 115a ||||||||
| 288h~288h | END BLOCK VALUE OF FIRST SECTION — 116a ||||||||
| 28Ch~28Fh | END TACHO VALUE OF FIRST SECTION — 117a ||||||||

FIG. 9

| PRE-PROCESS | CURRENT PROCESS | POST-PROCESS |
|---|---|---|
| X | 1 | 2 |
| 1 | 2 | 3 |
| 2 | 3 | 13 |
| 3 | 13 | 14 |
| 13 | 14 | 15 |
| 14 | 15 | 17 |
| 15 | 17 | 18 |
| 17 | 18 | X |

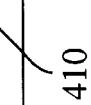

| OFFSET | | |
|---|---|---|
| 00h~03h | colspan=2 | 0000h |
| 04h~07h | 18h | 03h |
| 08h~0fh | colspan=2 | — |
| 10h~13h | colspan=2 | 8080h |
| 14h ~ 01FFh | colspan=2 | ⋮ |
| 200h~203h | colspan=2 | 0000h |
| 204h~207h | colspan=2 | 0010h |
| 208h~20bh | colspan=2 | 0010h |
| 20Ch~20fh | colspan=2 | 0110h |
| 210h~213h | colspan=2 | 0001h |
| 214h~27fh | colspan=2 | — |
| 280h~283h | colspan=2 | 0000h |
| 284h~287h | colspan=2 | 0010h |
| 288h~28bh | colspan=2 | 0010h |
| 28Ch~28fh | colspan=2 | 0110h |
| 300h~303h | colspan=2 | 0028h |
| 304h~307h | colspan=2 | 0290h |
| 308h~30bh | colspan=2 | 0038h |
| 30Ch~30fh | colspan=2 | 0390h |
| 310h~313h | colspan=2 | 0001h |
| 314h~37fh | colspan=2 | — |
| 380h~383h | colspan=2 | 0028h |
| 384h~387h | colspan=2 | 0290h |
| 388h~38bh | colspan=2 | 0038h |
| 38Ch~38fh | colspan=2 | 0390h |
| 400h~403h | colspan=2 | 0048h |
| 404h~407h | colspan=2 | 0490h |
| 408h~40bh | colspan=2 | 0063h |
| 40Ch~40fh | colspan=2 | 0640h |
| 410h~413h | colspan=2 | 0001h |
| 414h~47fh | colspan=2 | — |
| 480h~483h | colspan=2 | 0048h |
| 484h~487h | colspan=2 | 0490h |
| 488h~48bh | colspan=2 | 0063h |
| 48Ch~48fh | colspan=2 | 0640h |

FIG. 14

| PRE-PROCESS | CURRENT PROCESS | POST-PROCESS |
|---|---|---|
| 1 | 2 | X |
| X | 3 | 1 |
| 3 | 1 | 2 |
| ⋮ | ⋮ | ⋮ |

| READ OPERATION COMMAND QUEUE | | | | | | | WRITE OPERATION COMMAND QUEUE | | | | | |
|---|---|---|---|---|---|---|---|---|---|---|---|---|
| PROCESS ID | PROCESS START POSITION | COMMAND | COMMAND PARAMETER | ACCEPTANCE TIME | SPECIFIED TIME | ASSUMED PROCESS TIME | PROCESS ID | PROCESSING START TIME | COMMAND | COMPACT PARAMETER | ACCEPTANCE TIME | SPECIFIED TIME | ASSUMED PROCESS TIME |
| | | | R/W CHANGE MARK | | | | | | | R/W CHANGE MARK | | | |
| | | | | | | | | | | | | | |
| | | | | | | | | | | | | | |

FIG. 16

OPTIMIZING THE EXECUTION SEQUENCE IN A TAPE APPARATUS IN ORDER TO MINIMIZE TAPE TRAVELING DISTANCE

FIELD OF THE INVENTION

The present invention relates to a magnetic tape device having an improved data processing ability. More particularly, the present invention relates to a magnetic tape device which selectively executes data access requests from a host apparatus in accordance with predetermined rules which reduce the need to reposition the tape between data access requests. The present invention further relates to a magnetic tape device capable of storing individual data items into plural non-continuous regions on a tape medium in order to facilitate the allocation of additional space for individual data items, without sacrificing storage efficiency.

BACKGROUND

In a conventional magnetic tape apparatus such as the apparatus shown in FIG. 1, a command issued from a host apparatus 10 to a magnetic tape apparatus 20 is received by a driver/receiver 21. The driver/receiver notifies a controller 23 regarding the reception of a command and stores the command and related parameter(s) to a buffer 22.

Upon initial mounting of a tape, the control apparatus reads volume management information 25 from the magnetic tape medium and stores the information to a memory 24. The volume management information 25 stored in memory 24 is updated each time a write process is conducted to the magnetic tape apparatus, and is subsequently written to the magnetic tape medium prior to dismounting of the magnetic tape medium.

The controller 23 analyzes the commands and parameters stored in the buffer 22 to determine whether repositioning (driving) of magnetic tape is necessary. The controller tracks a current tape position, and determines direction and distance from the current position to a target position. A tape driver notifies the controller when the tape has been positioned to the target position. The controller 23 conducts, upon recognition of completion of tape positioning, data read and write operations via the magnetic head 27 depending on the command received from the host apparatus.

Importantly, conventional magnetic tape apparatus processes data access requests in the order in which they are received, i.e., without regard for the storage location of the data on the magnetic medium. As a result, data access throughput is sacrificed by the need to reposition the tape medium between each data access request.

A second problem associated with conventional magnetic tape apparatus relates to difficulty in allocating additional storage space for a given data item. A conventional tape apparatus stores each discrete data item in a continuous manner on the tape medium. Importantly, increasing the size of a data item requires the allocation of additional continuous storage space. If additional continuous space sufficient to accommodate the increase is not available, then the entire data item must be rewritten in another location in which sufficient continuous storage space is available. Obviously, this rewriting process is inefficient, and reduces data access throughput.

OBJECTS OF THE INVENTION

Accordingly, one object of the present invention to provide an improved tape apparatus which increases the throughput of data access requests by rearranging the sequence in which the requests are executed.

Moreover, another object of the present invention is to provide an improved tape apparatus capable of storing a discrete data item in a plurality of non-continuous regions on a tape medium, such that allocation of additional storage for a data item may be accomplished easily and efficiently.

SUMMARY OF THE INVENTION

The new and improved tape apparatus of the present invention includes a memory for at least one command queue table for storing a plurality of instructions from a host apparatus, and an execution queue table. The apparatus of the present invention further includes a reordering feature in which data access requests stored in the execution queue table are analyzed in conjunction with volume management information according to a predetermined set of rules. Importantly, the reordering feature changes the sequence of the data access requests stored in the execution queue table in order to minimize repositioning of the tape medium.

According to another embodiment of the invention, the tape apparatus has a control mechanism for recognizing a data storing position corresponding to a data access command using volume management information. The volume management information includes information for treating a plurality of non-continuous regions as a single data item. Thus, a discrete data item need not be stored in a continuous region of a tape. Moreover, the size of the discrete data item may be increased without the need for additional continuous storage space, and without the need to recopy the data item into a continuous region of the tape medium.

According to one aspect of the invention, the tape apparatus requests defragmentation processing when the number of non-continuous regions for a given data item increases beyond a predefined level.

BRIEF DESCRIPTION OF THE DRAWINGS

These and other features of this invention will become more apparent, and the invention itself will be best understood by reference to the following description of an embodiment of the invention taken in conjunction with the accompanying drawings, in which:

FIG. 9 is a diagram showing the volume management information according to one embodiment of the present invention;

FIG. 13(a) shows command queue tables for a partitioned tape according to the present invention;

FIG. 13(b) shows an execution queue for the command queue tables of FIG. 12(a);

FIG. 13(c) shows another execution queue for the command queue tables of FIG. 12(a);

FIG. 14 shows a format of the volume management information according to the present invention;

FIG. 16 shows a format of the command queue table according to one embodiment of the present invention.

DESCRIPTION OF THE PREFERRED EMBODIMENTS

The preferred embodiments of the present invention will now be explained with reference to the accompanying drawings.

Figure 1:
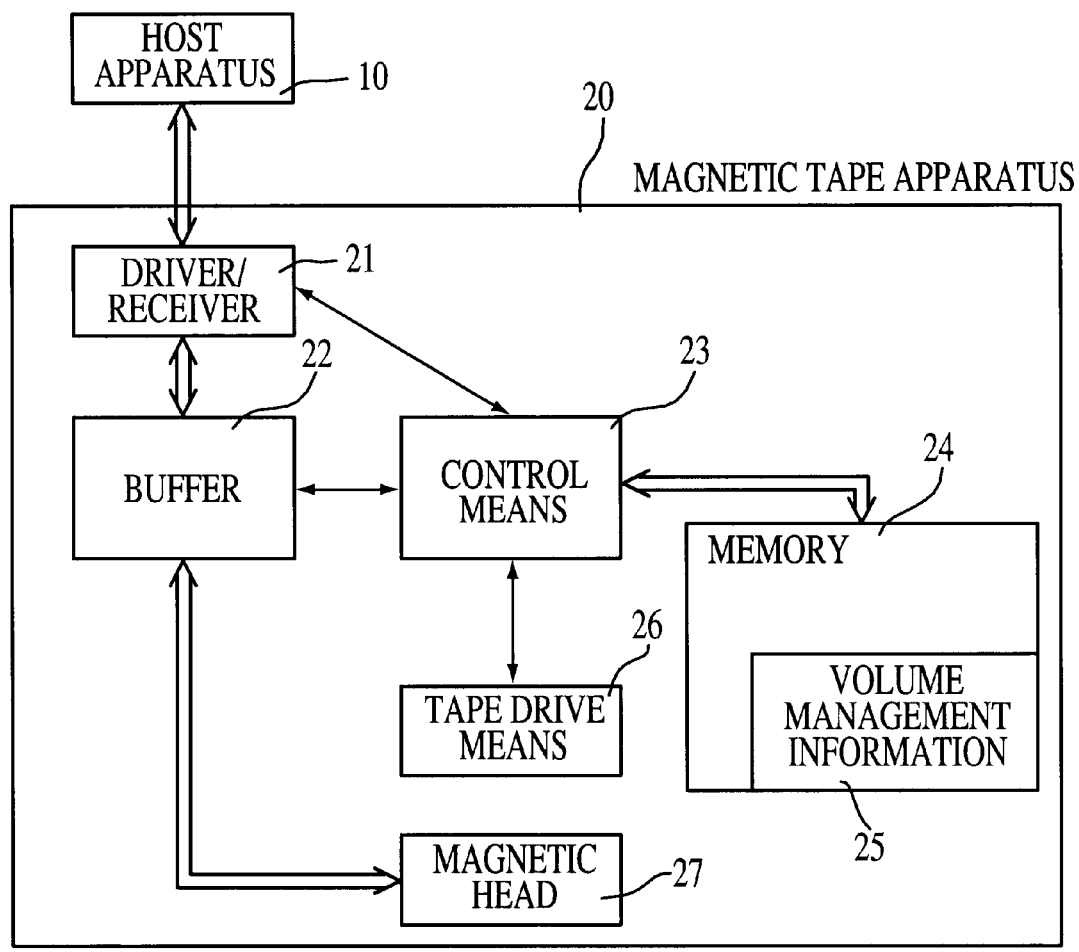
FIG. 1 is a flow chart explaining operation of a conventional magnetic tape apparatus.
Figure 2:
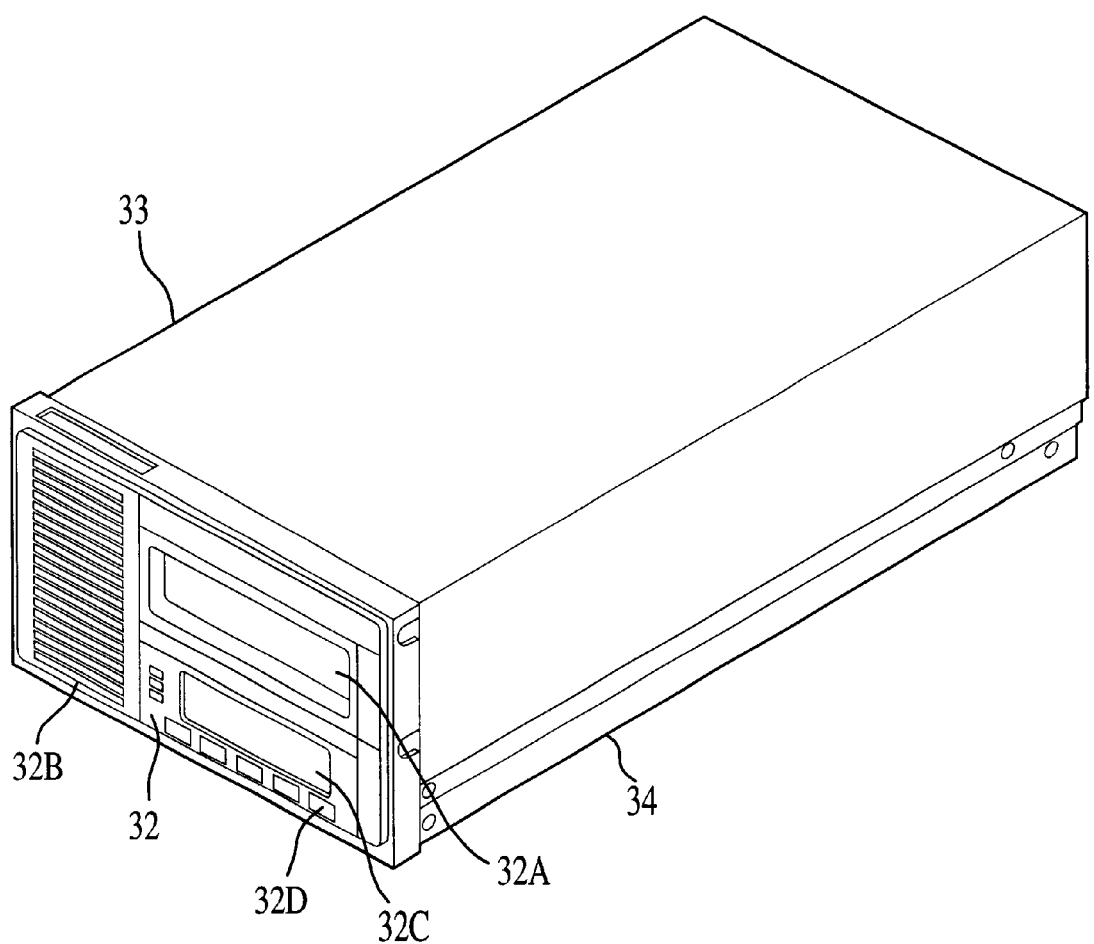
FIG. 2 is a perspective view of the magnetic tape apparatus of the present invention.

The structure of a first embodiment of the magnetic tape apparatus of the present invention will be explained with reference to FIGS. 2 and 3. FIG. 2 is a perspective view showing a preferred embodiment of the magnetic tape apparatus of the present invention, and FIG. 3 shows the magnetic tape apparatus of FIG. 2 with an upper cover 33 removed.

Figure 3:
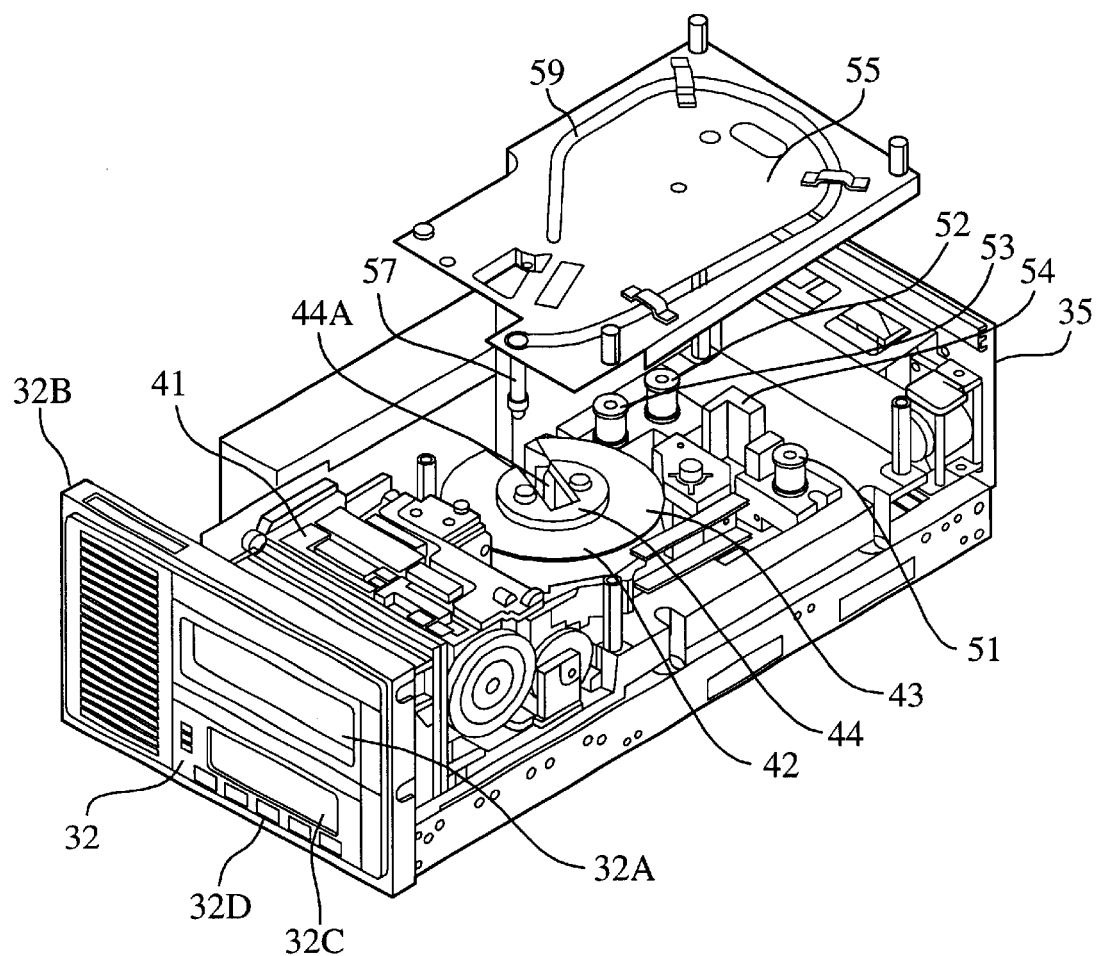
FIG. 3 is a front elevation view of the magnetic tape apparatus of FIG. 2 with the upper cover removed.

The magnetic tape apparatus of the preferred embodiment includes a front panel 32, an upper cover (unitary ceiling plate and side plate) 33, a bottom plate 34 and a rear plate 35 (FIG. 3). The front panel 32 is provided with a cartridge inserting port 32A, a lattice type opening 32B providing ventilation, a display section 23C and a manipulating section 32D.

Figure 4:
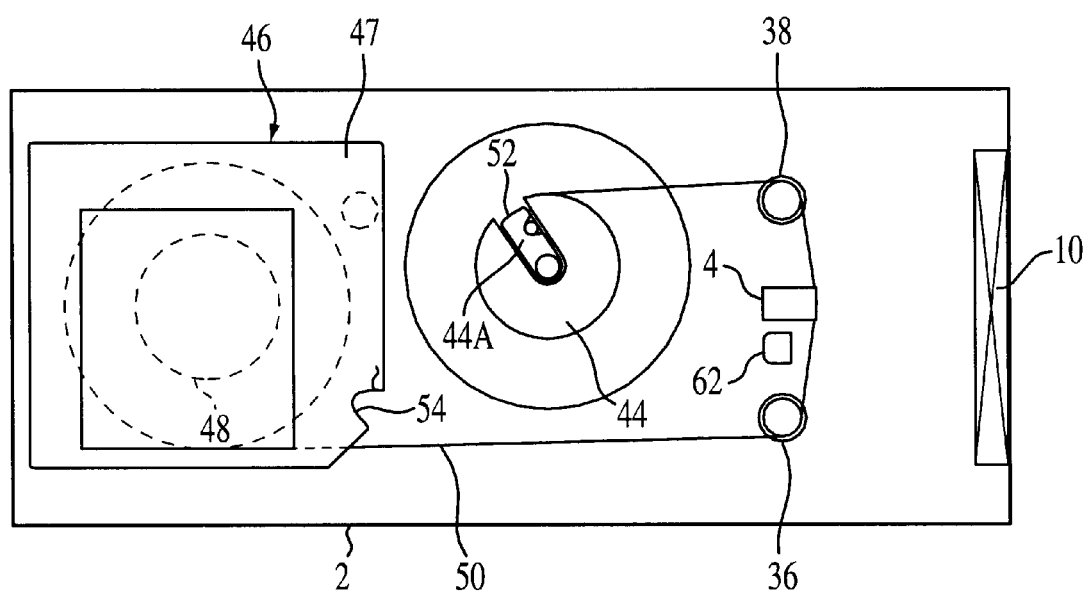
FIG. 4 is a diagram showing the essential portion of the magnetic tape apparatus of FIG. 2.

The magnetic tape apparatus of the present invention further includes a conventional reading/writing mechanism for reading/writing data from/to conventional magnetic tape cartridges. FIG. 4 is a plan view of the magnetic tape apparatus according to one embodiment of the present invention. Reference numeral 46 designates a conventional magnetic tape cartridge which has been loaded in a predetermined position in the apparatus by a loader assembly 41 (FIG. 3). The conventional magnetic tape cartridge 46 includes a cartridge case 47, hub 48, and a magnetic tape 50 having one end fixed to the hub 48 and a leader block 52 fixed at the other end (free end).

In the unloaded condition, magnetic tape 50 is wound about the hub 48, and the leader block 52 is held in engagement with the case by an engagement portion 54. However, FIG. 4 shows a condition in which the leader block 52 has been loaded within the machine reel 42.

The cartridge 46 is loaded into the apparatus from the cartridge inserting port 32A with the assistance of the loader 41 (FIG. 3). During a tape mounting operation, the leader block 52 is disengaged from engagement portion 54 and coupled within a slot 44a within hub 44 of a machine reel 42. The magnetic tape is unwound from the cartridge onto the machine reel 42 as the machine reel is driven by a machine reel motor 43. Moreover, roller guides 36, 38 guide the magnetic tape as it is wound around the hub 44 of the machine reel 42.

A threader 55 has a threader pin 57 which slides along a path 59. The threader pin 57 is coupled with the leader block 52 to guide it until it is coupled with the part 44A of the hub 44. A magnetic head assembly 56 located between the roller guides 36, 38 conducts data read/write operations to/from the magnetic tape.

Figure 5:
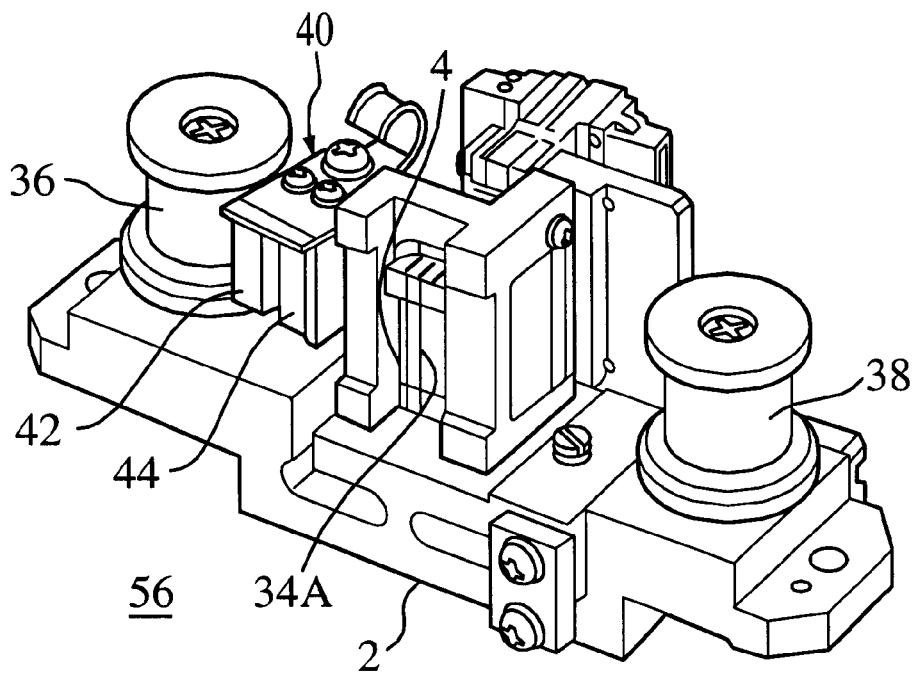
FIG. 5 is a perspective view of the head assembly of the magnetic tape apparatus of FIG. 2.

FIG. 5 is a perspective view of the head assembly 56 showing a magnetic head 4 fixed to a frame 2. The head assembly 56 is provided with an air escape 34A formed at the tape contact surface of the magnetic head 4 in order to maintain contact between the head and the magnetic tape. Moreover, a tape cleaner 40 is also provided between the roller guide 36 and magnetic head 4. The tape cleaner 40 includes edges 42 and 44 composed of super-hard alloy which are placed in contact with the running magnetic tape at a shallow angle, to remove contaminants adhered to the magnetic tape.

Figure 6:
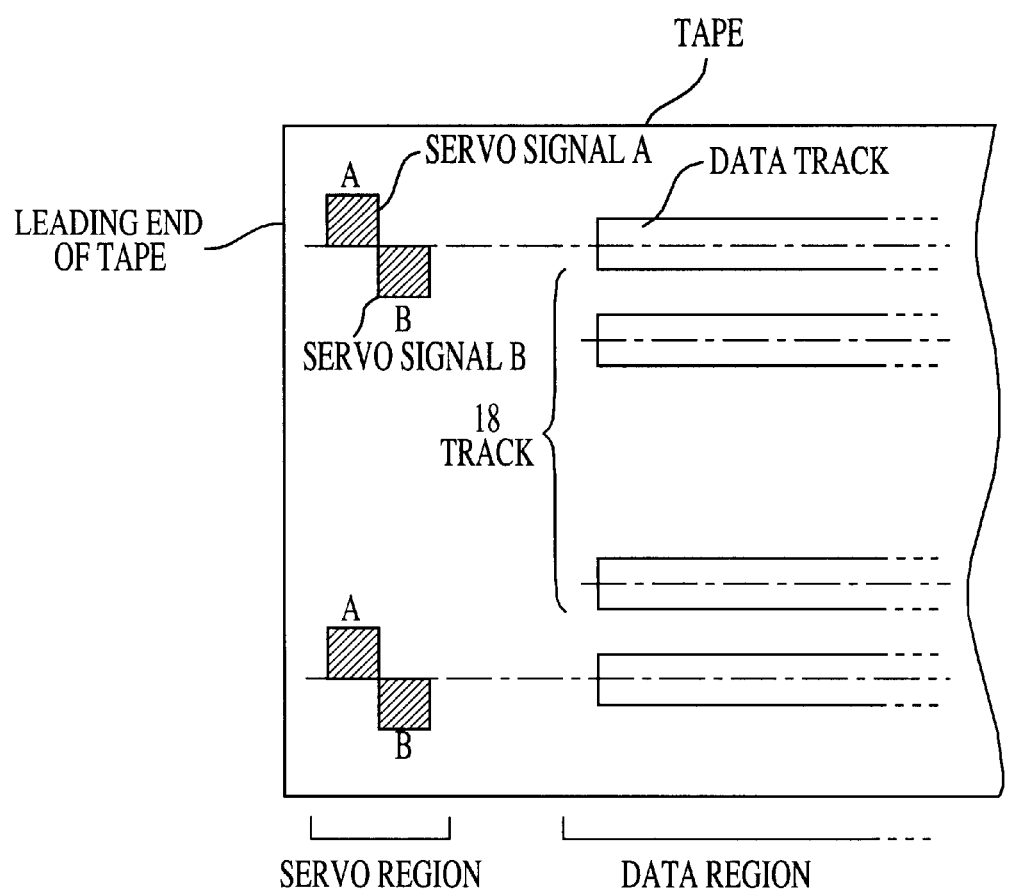
FIG. 6 shows a recording format of the magnetic tape medium.

FIG. 6 shows an example of a tape format in which data is stored in plural tracks 2. The magnetic head is provided with plural read/write cores (hereinafter referred to as head core) for recording/reproducing data simultaneously to/from the plural tracks 18.

When data is recorded for the first time to a magnetic tape, a servo signal must first be recorded in a servo region at the head of the magnetic tape. In the case of recording ordinary data, i.e., non-servo data, the magnetic head is positioned to the data region of the tape using the servo signal.

Figure 7:
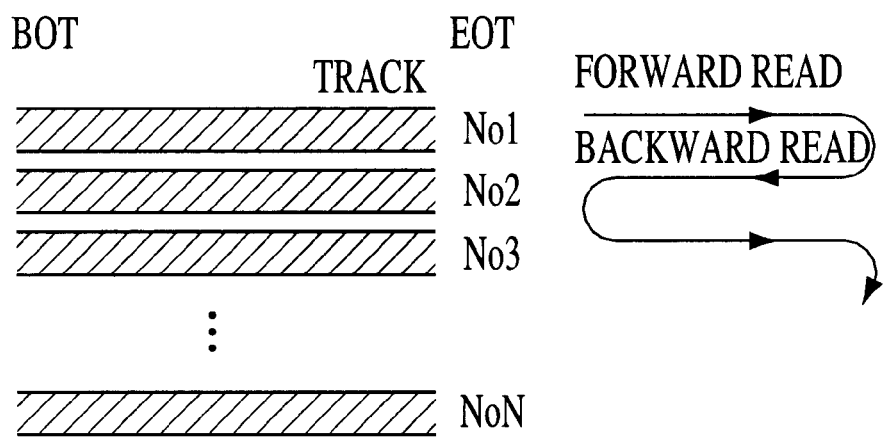
FIG. 7 shows a direction for recording/reproducing information in a multi-track magnetic tape medium according to the present invention.

FIG. 7 shows the direction for recording/reproducing information in a multi-track magnetic tape medium according to the present invention.

According to this aspect of the invention, track No. 1 is read, for example, from the beginning of tape (BOT) toward the end-of-tape (EOT) and then track No. 2 is read from the EOT toward the BOT in a generally serpentine manner. Subsequent recording/reproducing processes are performed in the same serpentine manner. The BOT and EOT positions are stored in the volume management information.

Figure 8:
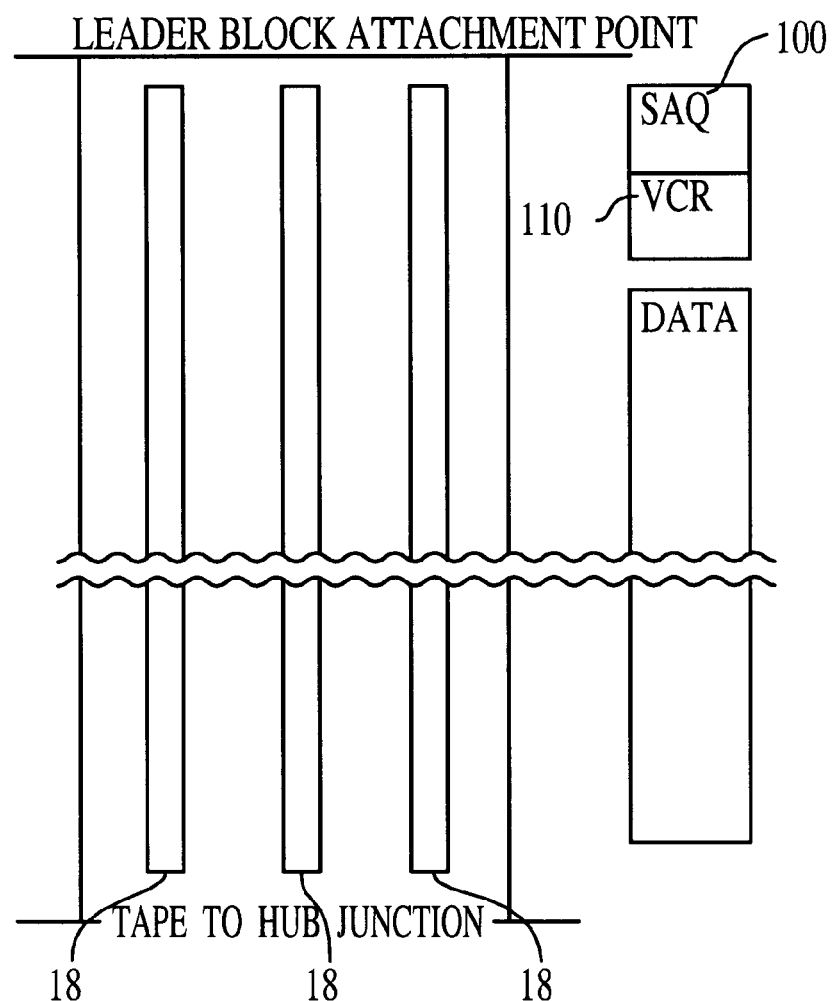
FIG. 8 shows the relative location of servo information and data in a magnetic tape medium according to the present invention.

FIG. 8 shows the relative location of servo information and data in a magnetic tape medium according to the present invention.

As previously explained, the magnetic tape medium is provided with a plurality of tracks. Each track has a tracking servo region (SAQ) 100 at a leading end of the tape medium. The SAQ is a recorded signal provided to indicate the BOT. Immediately after the SAQ 100, a medium control region (VCR) 110 exists. VCR 110 includes volume management information (DBM) indicating arrangement of data recorded on the relevant magnetic tape. A structure of DBM is shown for example, in FIG. 9. DBM includes a general information section 111, a vacant region management section 112 and a plurality of partition packet sections 113.

Data is recorded in constant length portions (blocks), each block being assigned a block number in ascending order from the leading end of the tape medium.

The magnetic tape apparatus tracks a coarse tape position using a counter counting a number of constant angle rotations. The value of this counter is termed a tacho value. The block number can be used as logical position information and the tacho value as physical distance information from the head (front) section of the tape.

The vacant management section 112 stores the location of vacant regions on the magnetic tape medium. The partition packet section 113 stores a starting block ID number 114 and an ending block ID number 116, a starting tacho value 115 and an ending tacho value 117, and a number of divided sections 118. It should be noted that a separate partition packet section 113 is provided for each data item stored on the magnetic tape medium.

As described above, one aspect of the present invention relates to the storing of a discrete data item in a plurality of non-continuous regions of the tape medium. Consequently, it is necessary to provide a way to determine the location of each of the non-continuous regions on the magnetic tape medium. Therefore, section information of each section 119 is also recorded in addition to the above-described information. Moreover, since the number of sections is not constant, the number of divided sections is also stored (divided number of sections 118). The section information stores information about the start 114a and end block number 116a, as well as start 115a and end tacho values 117a.

The vacant region management section 112 conducts management of vacant (unused) blocks on the magnetic tape medium using a bit map of all of the blocks on the magnetic tape medium. The bit map may utilize a 1:1 correspondence between bits and blocks, or may utilize a 1:N correspondence (where N is an integer larger than 1). However, if a correspondence of 1:N is used, a plurality of blocks (N blocks) corresponding to one bit must be considered as a continuous block group.

During a write process, the magnetic tape apparatus searches for the vacant blocks by making reference to the vacant region management section. For example, if a bit value of 1 indicates a vacant region, the bit of value 1 is searched and data is written to the block corresponding to the relevant bit. Thereafter, the number of sections and section information of the partition packet of DBM are updated.

The present invention can also be applied to a magnetic tape which has been formatted (partitioned) into two or more partitions. Notably, each partition is considered as a distinct data region and the region management explained above is conducted separately with respect to each partition. In fact, each distinct partitions may be used as a logical magnetic tape. Thus, data partitioning enables divided management of a magnetic tape medium into a plurality of regions.

As previously discussed, storage utilization of the magnetic tape medium can be improved by storing the divided data. However, excessive data division reduces access performance. Thus, when the number of non-continuous sections for a given data item exceeds a first predetermined number, a well known defragmentation process is initiated to reduce the number of non-continuous sections below a second predetermined number. The defragmentation process consists of rewriting the non-continuous sections for a given data item onto the tape in a continuous manner, and is known by those of ordinary skill in the art. For this reason, a detailed description of the defragmentation process will be omitted.

Figure 10:
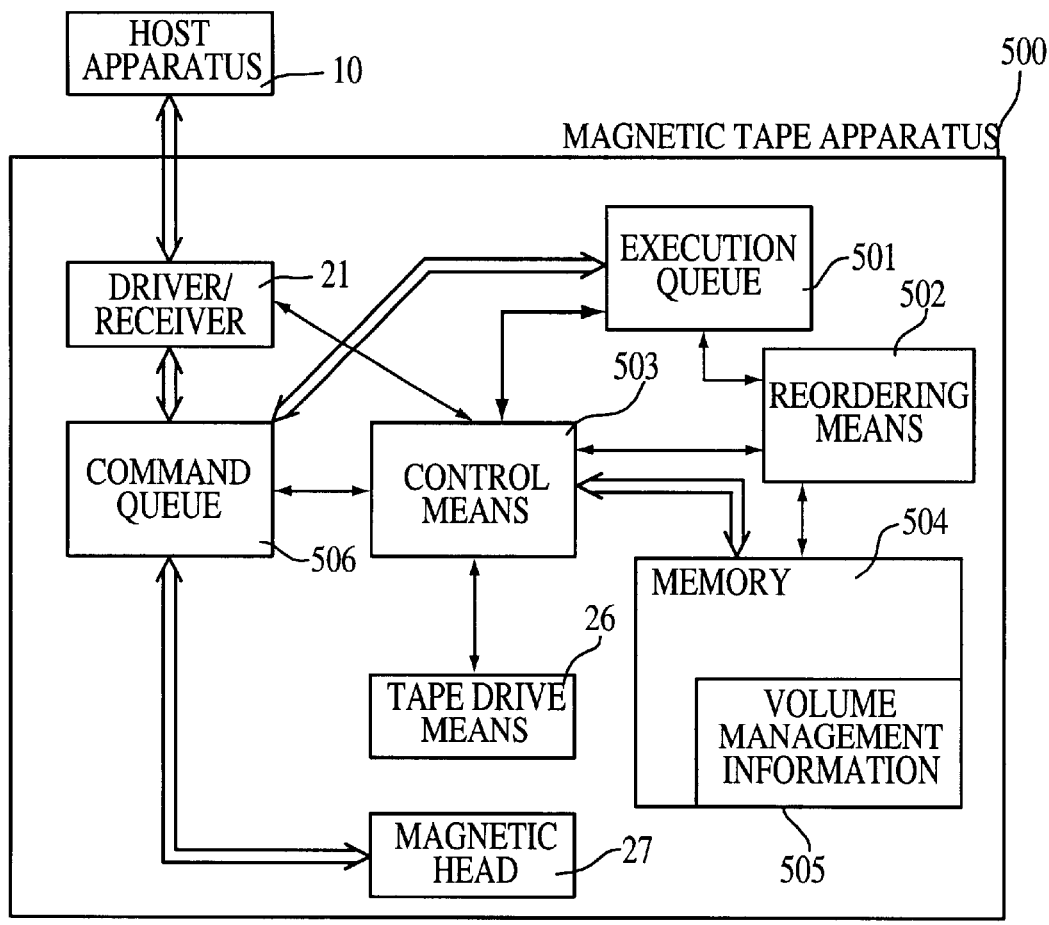
FIG. 10 is a flow chart explaining operation of a magnetic tape apparatus according to one embodiment of the present invention.

FIG. 10 is a flow chart explaining the operation of a magnetic tape apparatus according to one embodiment of the present invention.

Commands issued from the host apparatus 10 to the magnetic tape apparatus 500 are received by the driver/receiver 21, which in turn notifies a controller 503 and stores the commands and associated parameters to the command queue (memory) 506.

Upon initial mounting of a tape medium, the controller 503 reads the volume management information 505 from the magnetic tape medium and stores it in the memory 504. The volume management information 505 is updated in memory 504 each time a write process is conducted to the magnetic tape apparatus, and the updated information is rewritten to the magnetic tape prior to dismounting of the magnetic tape medium.

The controller 503 moves commands from the command queue 506 to an execution queue (memory) 501 and initiates a reordering feature 502 which reorders the queued commands according to predefined rules. For example, the reordering feature 502 may optimize the execution sequence of the executable commands so as to reduce an indexing amount of the tape.

Figure 11:
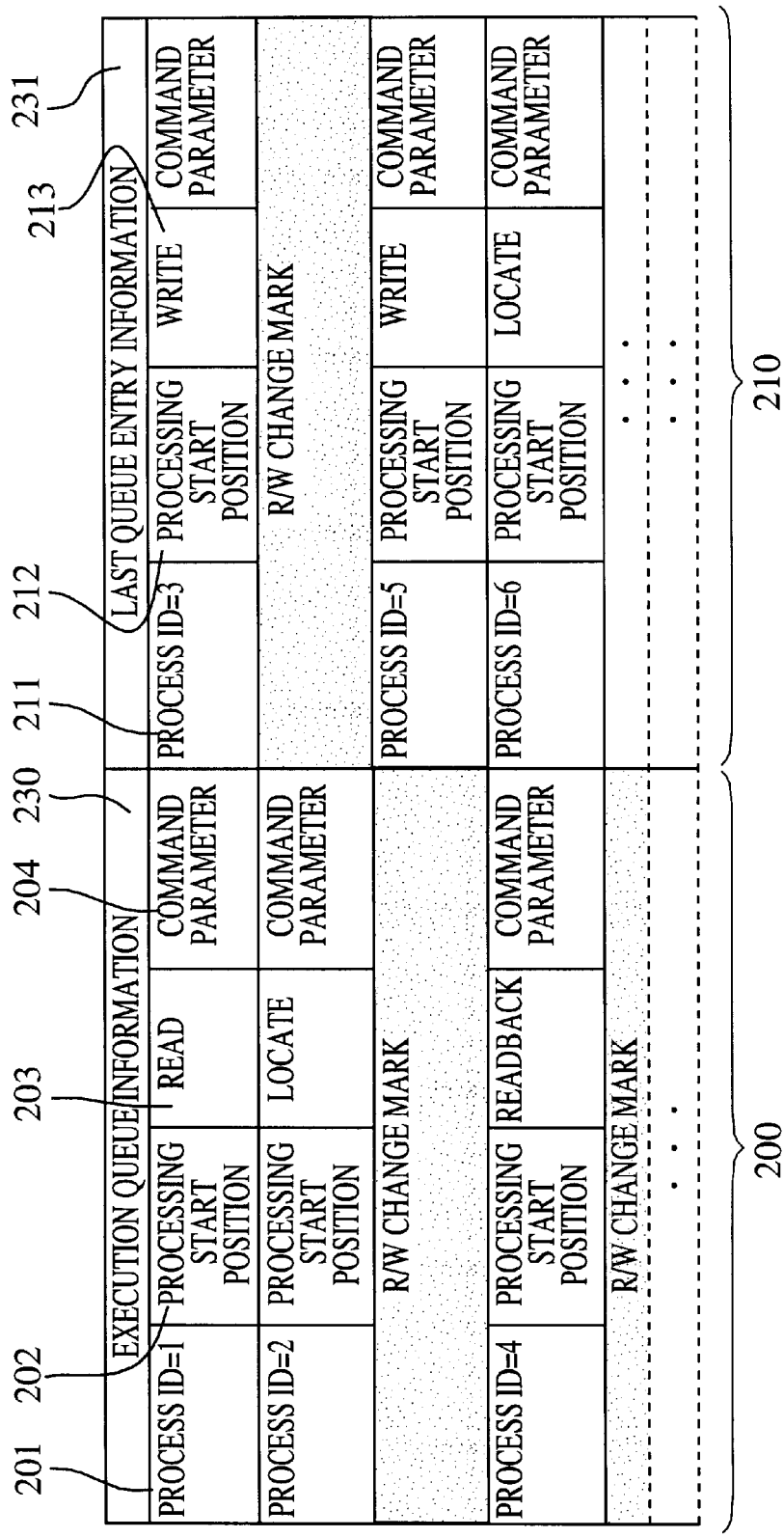
FIG. 11 is a diagram showing a format of the queue table according to the present invention.

FIG. 11 shows a command queue table of the present invention. Plural command queue tables are held in the magnetic tape apparatus, one table being used for each partition existing in the magnetic tape medium. In the event that the magnetic tape medium is not divided into partitions then only a single command queue table is needed.

Moreover, each of the command queue tables may be contained in a single memory. In fact, the command queue table(s), execution queue and the volume management information may all be contained in a single memory.

Referring now to FIG. 11, each command queue table is divided into a read queue 200 and write queue 210. The magnetic tape apparatus assigns a unique ID to each of the stored commands. The process ID indicates the sequence in which the magnetic tape apparatus has accepted commands from the host apparatus. Thus, process 201 was received before process 211.

The processing start positions 202 and 212 indicate the data position (location along the tape medium) for which the host apparatus has requested a read or write operation. This data position can be designated by the host apparatus using the partition number and data number on the magnetic tape medium. The processing start positions stored in the command queue table may directly store the partition number and data number designated by the host apparatus, or they may store the block number or a converted tacho value by making reference to the volume management information.

Commands 203 and 213, and command parameter 204 indicate the commands and command parameters issued from the host apparatus.

Each entry in the command queue includes a processing ID processing start position command and a command parameter. Each command queue table includes execution queue information 230 and last-queue-entry information 231. The execution queue 230 indicates whether the command currently being executed is a read or a write operation. The last-queue-entry information 231 indicates whether the most recent entry in the queue was a read or a write command, and is used to preserve the relative execution sequence of read and write commands.

The tape apparatus adds information to the individual command queues depending on the last-queue-entry information 231 and the type of command accepted from the host apparatus. When a command requesting a read operation is accepted from the host apparatus and the previous entry in the queue shows a read operation (last-queue-entry information="read"), the command is simply added to the end of the read queue of the command queue table.

However, when a command requesting a read operation is accepted from the host apparatus and the previous entry in the queue shows a write operation (last-queue-entry information="write"), a read/write alteration mark is added to the end of the write queue of the command queue table, and the command accepted is added to the end of the read queue. In addition, the last-queue-entry information is changed to "read".

In contrast, when a command requesting a write operation is accepted from the host apparatus and the previous entry in the queue indicates a write operation (last-queue-entry information="write"), the command is simply added to the end of the write queue of the command queue table.

Likewise, when a command requesting a write operation is accepted from the host apparatus and the previous entry in the queue indicates a read operation, the read/write changing mark is added to the end of the read queue of the command queue table, and the command is added to the end of the write queue. In addition, the last-queue-entry information is changed to "write".

The last-queue-entry information is used to ensure that relative sequence of read and write commands is maintained during optimization of the execution sequence.

The relative sequence in which the read and write commands are issued is preferably not interchanged. In other words, if a given read command is received before a given write command then that read command is preferably executed before the write command.

The importance of maintaining the execution sequence is understood when considering, for example, the case where a write operation modifies the contents of a given data item. Interchanging the execution sequence of the read and write commands will result in the reading the wrong value during the read operation. However, the execution sequence of commands of the same type (read or write) may be freely interchanged without affecting the processing results.

For example, a series of read commands R1, R2, R3 is received before a write command W4. The sequence in which the read commands is executed can be rearranged as (R1, R3, R2), (R2, R3, R1), (R2, R1, R3), (R3, R2, R1), (R3, R1, R2) without affecting data processing operations. However, irregardless of the order in which the read commands is executed, the write command is still preferably executed after execution of each of the prior commands.

Next, the procedure for adding information to the queues will be explained using the following example. As a matter of convenience, commands accepted from the host apparatus are expressed using the following syntax "(processing ID, object partition No., command)". In the command field, a read command is expressed as "R", a write command as "W" and a locate command (i.e., a command indicating only positioning) as "L".

Assuming, for example, that three partitions exist on the magnetic tape apparatus medium and that the following commands are accepted from the host apparatus: (1,1,R) (2,2,R) (3,3,R) (4,1,R) (5,2,R) (6,3,R) (7,1,L) (8,2,R) (9,3,W) (10,3,R) (11,2, W) (12,1, W) (13,3,R) (14,2, W) (15,1,R) (16,3, W) (17,2,R) (18,1, W) (19,2, W) (20,1,L) (21,3, W) (22,2, W) (23,3,L) (24,1, W).

By manner of illustration, the procedures for generating a queue table for partition 1 will be explained with reference to FIG. 12. The commands accepted from the host apparatus in regard to partition 1 are:

(1,1,R) (4,1,R) (7,1,L) (12,1, W) (15,1,R) (18,1, W) (20,1,L) (24,1, W).

The first command 300 is a read command having a processing ID=1, therefore this command is added to the read queue. The second command 306 is a read command time having a processing ID=4, and is added to the next position end of the read queue, and the third command (7,1,L) is a locate command having a processing ID=7. It should be noted that though this command is not a read/write operation, it is added to the queue indicated by the last-queue-entry information.

The fourth command (12,1, W) is a write command, and is added to the write queue 301. Moreover, since the last-queue-entry information indicates a read operation, the read/write changing mark 308 must be added to the end of the read queue. This mark preserves the execution sequence of read and write commands by indicating that the next command should be processed from the other queue. In this case the read/write mark is encountered after processing command 307, and the next command processed will come from the write queue.

Figures 12A, 12B:
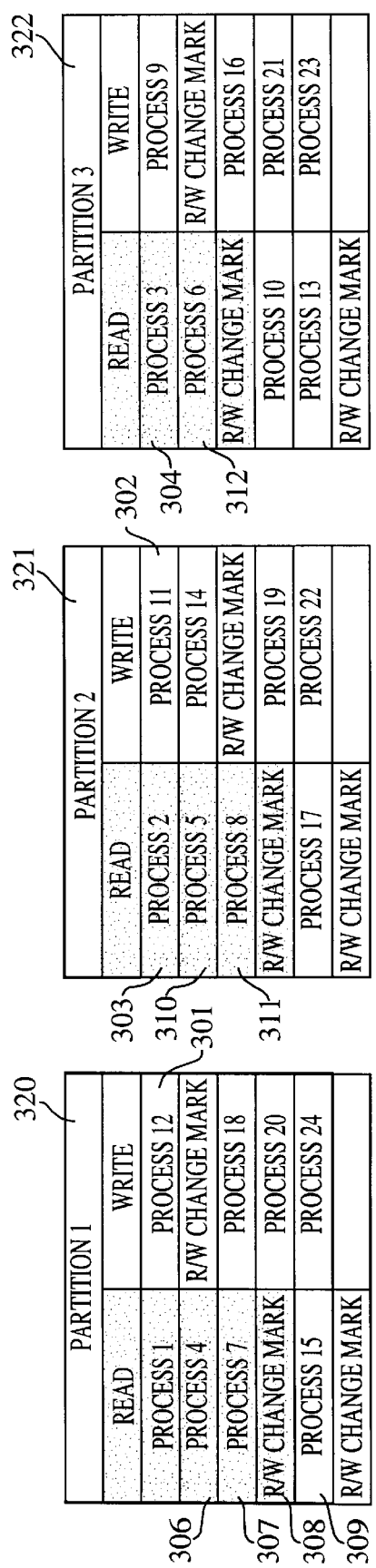
FIG. 12(a) shows command queue tables for a partitioned tape according to the present invention.
FIG. 12(b) shows the execution queue for the command queue tables of FIG. 12(a)

When the process explained above is repeated for each of the commands relating to partition 1, the command queue table 320 shown in FIG. 12(a) can be completed. Moreover, by following the same procedure, command queue tables 321 and 322 can be completed for partitions 2 and 3.

Next, the procedure for executing the commands accumulated in command queue tables will be explained.

Referring to table 320 of FIG. 12(a), the three commands 300, 306 and 307 may be interchanged freely for the execution sequence. Meanwhile, the commands 307 and 309 should not be interchanged in the execution sequence because as mentioned previously, the execution sequence of the read command and write commands should not be inverted. Notably, the read/write changing mark 308 is interposed between read commands 307 and 309, thereby signaling that write command 301 must be executed before read command 309.

Data for each tape partition is accessed independently of the other partition(s). Therefore, the magnetic tape apparatus determines the execution sequence of the queued commands for each tape partition independent of the other partitions. Moreover, as explained above, the execution sequence is flexible and it is not necessary to execute all the commands regarding a given tape partition before proceeding to the next partition. Thus, for example, when the command queue tables are in the condition of FIG. 12(a), the magnetic tape apparatus can freely determine the next command from among the commands 300, 306, 307 or 303, 310, 311 and 304, 312.

The magnetic tape apparatus of the present invention recognizes the start position of a data item by referring to the heading clock number stored in VCR 110. By knowing the current tape position and the target tape position for each of the commands, the magnetic tape apparatus can select the command in a sequence which minimizes or at least reduces the total moving distance of the tape medium.

A first embodiment of the present invention will now be explained with reference to FIGS. 10, and 13(a)–14, in which FIG. 13(a) shows command queue tables for partitions 1–3 and FIG. 14 shows VCR information 110 before and after optimization of the execution queue.

The controller 503 (FIG. 10) selects commands from the command queues and places the selected commands in the execution queue and initiates the reordering feature 502. The reordering feature 502 reorders the commands (processes) within the execution queue according to predefined criteria such as reducing the overall tape indexing.

Under the condition of FIG. 13(a), the magnetic tape apparatus can execute any process selected from among the read process 2 of partition 1, write process 3 of partition 2 or read process 1 of partition 3. The controller 503 stores the above three executable processes to the execution queue 501. In this example, there is no restriction on the execution sequence of the stored commands.

FIG. 13(b) shows the condition of the execution queue at various times. Notably, the first column of the table shows the previously executed process, the middle column shows the current process, and the last column shows the next process to be executed. For example, the first row of the table depicts a situation in which process 2 is currently being executed, and process 3 is next process to be executed.

The reordering feature searches the execution queue for the processing object command nearest to the current position of the head. Assuming, for example, that the current tape position is 0 and that the reordering feature knows that the starting position for process 1 is 48, the starting position for process 2 is 0, and the starting position for process 3 is 28. Therefore, the reordering feature determines that the process to be executed next is the process 2 because its starting position requires the shortest moving distance. The reordering feature subsequently changes the queue sequence of the execution queue, if necessary, in order to cause the controller to execute process 2. In this example, however, the reordering feature is not required to change the sequence of the execution queue since the process 2 is already located at the head of the execution queue.

The reordering feature informs the controller of the completion of optimization of execution queue whereupon the controller executes the process located at the head of the execution queue and notifies the reordering feature upon completion thereof. Returning to the example, upon completion of process 2, the reordering feature deletes process 2 from the execution queue, and the next process in the queue now becomes the next executable process for partition 1. Accordingly, the reordering feature detects the read/write changing mark 410, and recognizes that the next process is either write process 4 or one of the processes from partition 2 or partition 3. For the sake of example we will assume that process 1 from partition 3 is selected as the next executable process.

After completing process 1, the reordering feature recognizes that the next command is one of the processes selected from among the write process 4 of partition 1, write process 3 of partition 2 or read process 1 of the partition 3. The controller stores the above three executable processes to the execution queue, and the reordering feature reorders the processes according to predefined criteria which will be discussed below. As explained above, in this timing, there is no restriction in the sequence of queues indicated by the execution queue. FIG. 13(c) shows, as an example, the condition of the execution queue in which the processing sequence has been re-arranged beginning with process 4, followed by process 3 and process 1.

The reordering feature optimizes the command execution process each time a read/write process is completed, by comparing the starting positions of each of the queued commands with the current position, and selecting the command requiring the shortest tape driving distance. According to this embodiment, the entire queue is examined each time a command is completed.

Next, a second embodiment of the present invention will be explained with reference to FIGS. 13(a)–14. For simplification, the command queue of each partition is assumed to be in the condition of FIG. 13(a) and the VCR information 110 is assumed to be in the condition of FIG. 14. Moreover, a data arrangement on the magnetic tape medium and positional relationship of the magnetic head are assumed to be in the state shown in FIG. 15.

Since the number of commands stored on the queue table changes dynamically, it is difficult to continuously optimize the traveling distance of the tape with regard to all of the queued commands. Importantly, according to the first embodiment, the execution sequence is optimized on an individual command basis by selecting the command requiring the smallest tape driving distance, without considering the overall driving distance. In contrast, the optimization process of the second embodiment reduces the overall driving distance by examining a predetermined number of commands at a time, and thus presents a further improvement over conventional devices in which commands are received and processed without any consideration for the tape driving distance.

The reordering feature of the second embodiment further reduces the tape driving distance by optimizing the execution sequence for a predetermined number of commands at a time. The procedure for registering the executable processes to the execution queue in the second embodiment are similar to the procedure of the first embodiment and therefore the details are omitted here.

According to the second embodiment, the magnetic tape apparatus optimizes the execution sequence for the first N commands in the execution queue. Assuming N=3, there are N*(N−1)=6 possible sequences for executing the three selected commands. The total tape moving distance is calculated for each of the possible sequences, and the sequence yielding the smallest total tape driving distance is selected.

Figures 15A, 15B:
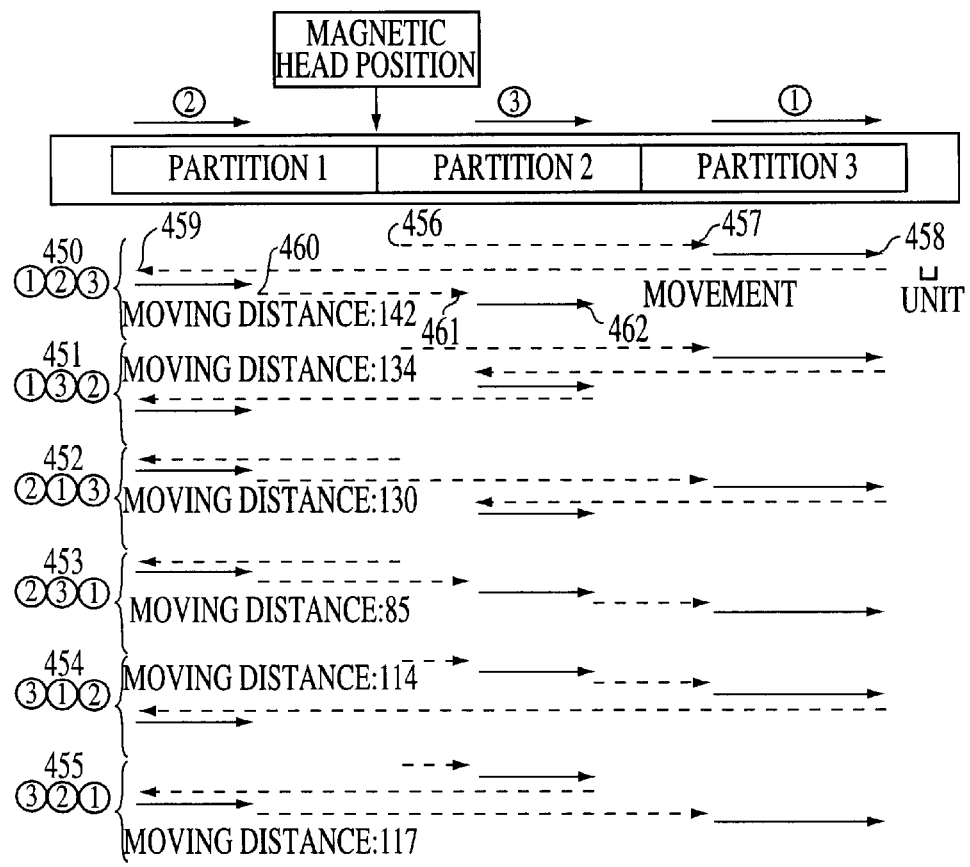
FIG. 15(a) is a diagram showing potential sequences for executing instructions stored in the command queue table according to one embodiment of the present invention.
FIG. 15(b) shows the condition of the execution queue for one of the sequences of FIG. 15(a)

FIG. 15 shows the six possible sequences (450–455) for executing commands 1, 2 and 3.

According to processing sequence 450, the commands are executed in the sequence of the process ID=1, process ID=2 and process ID=3. Assuming that the magnetic head is initially located at position 456 (block 22) before the start of processing, the magnetic tape apparatus must drive the tape to the position 457 (block 48), i.e., a total moving distance (48−22) of 26 blocks.

During the data read of process ID=1, the tape is driven an additional 15 blocks to position 458 of block 63. Consequently, the total moving distance becomes 41 blocks.

Next, the tape must be driven to position 459 in order to execute process ID=2, then drive the tape 10 blocks from position 460 prior to executing process ID=3. In this manner, processing procedure 450 results in a total tape driving distance of 142 blocks.

The total tape driving distance for processing sequences 451 to 455 are determined in the same manner as 134, 130, 85, 114 and 117 blocks, respectively. Notably, the total driving distance of the tape can be minimized by selecting processing sequence 454.

In operation, the reordering feature selects the first N commands from among the commands registered in the execution queue, and determines the total moving distance for each of the possible sequences for processing the commands. Subsequently, the reordering feature re-arranges the execution queue in accordance with the processing sequence requiring the shortest total tape driving distance and notifies the controller, whereupon the controller executes the next process selected from the execution queue.

As a result, the magnetic tape apparatus can execute the commands in a semi-optimized processing sequence.

Upon completion of the previous N processes, the controller initiates the reordering feature to optimize the execution sequence for the next N commands registered to the execution queue.

According to the second embodiment, once a predetermined sequence of executable commands are optimized, subsequent commands are not examined until each of the commands in the predetermined sequence has been executed. However, as indicated in the previous embodiment, it is possible to newly detect again all executable processes when the process at the head of the execution queue has been completed.

Thereby, dynamic optimization of the processes in the execution queue can be realized to enhance the processing efficiency.

A third embodiment of the present invention will now be explained with reference to FIG. 16. This embodiment is similar to the previous embodiment, but addresses concerns regarding the execution of time sensitive commands. Notably, the command queue table of this embodiment further stores a command acceptance time 420, specified time 421 and estimated processing time 422 for each command entry.

The acceptance time 420 indicates the time when the process accepted from the host apparatus is registered to the queue table. The specified time 421 indicates an allowable time until detection of irregularity by the late (delayed) processing monitoring program from issuance of the relevant command by the host apparatus. The estimated processing time 422 indicates the amount of time which is assumed to be required for executing the relevant command.

According to this embodiment, the reordering feature first arranges the commands within the execution queue so as to minimize the driving distance of the tape medium. This reordering is accomplished using the procedure outlined with respect to either of the previous embodiments. Subsequently, however, the reordering feature further optimizes the execution queue to selectively reduce the waiting time for time critical commands, i.e., the amount of time until the command has been executed. This waiting time will hereinafter be termed processing delay-time.

Assuming, for the sake convenience, that process A has been determined as the next process to be executed on the basis of optimizing the driving distance. In other words, that process A has been placed at the head of the execution queue as a result of either of the above-described optimization processes. The reordering feature then determines the processing delay-time of each of the subsequent executable processes (hereinafter, waiting processes) by referring again to the execution queue and using the following equation:

$$\text{Processing delay} - \text{time} = \begin{pmatrix} \text{Current} \\ \text{time} \end{pmatrix} + \begin{pmatrix} \text{Estimated} \\ \text{processing} \\ \text{time for} \\ \text{executing the} \\ \text{head process} \\ \text{in the queue} \end{pmatrix} + \begin{pmatrix} \text{Estimated} \\ \text{processing} \\ \text{time for} \\ \text{executing the} \\ \text{waiting process} \end{pmatrix} - \begin{pmatrix} \text{Acceptance} \\ \text{time} \\ \text{of the} \\ \text{waiting} \\ \text{process} \end{pmatrix}$$

When the processing delay-time exceeds the specified waiting time of the process, the reordering feature re-arranges the execution queue so as to preferentially execute the delayed process before the execution of the process A. Consequently, the relevant waiting process is arranged in the execution queue before process A. Moreover, if the processing delay-time exceeds the waiting time for two or more processes, the process having the largest processing delay-time is executed preferentially. In this manner, a delay of a time critical process can be prevented without abandoning the overall benefits of optimizing tape driving distances.

Correspondingly, when the processing delay-time does not exceed the specified waiting time of the process, the reordering feature maintains the execution of the process A.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A tape apparatus having at least one head for writing and reading data to/from a tape medium, a drive mechanism for repositioning a tape medium along a longitudinal direction of the tape medium, and memory for storing volume management information indicating a recording position of at least one data item stored on a tape medium, said apparatus comprising:

a command queue for storing a plurality of access instructions from a host apparatus;

control means for selecting instructions stored in said command queue and placing said instructions in an execution queue; and reordering means for reordering said instructions stored in said execution queue according to a predetermined set of rules using said volume management information;

wherein said reordering means examines each instruction in said execution queue, and preferentially executes instructions which are late in a descending order such that instructions having a calculated value are executed prior to instructions having a lesser calculated value.

2. A tape apparatus according to claim 1, wherein the control means selects at least the two instructions from said command queue, and said reordering means determines a sequence for executing said at least two commands which will minimize an overall amount of repositioning of a tape medium.

3. A tape apparatus according to claim 1, wherein said reordering means reorders said instructions stored in said execution queue, such that a command stored in a head of said execution queue requires a minimum repositioning of a tape medium from a current position of the tape medium.

4. A tape apparatus according to claim 3, wherein a selected command is late if a calculated value CV is greater than a predetermined value V, where $$CV = \begin{pmatrix} \text{Current} \\ \text{time} \end{pmatrix} + \begin{pmatrix} \text{Estimated} \\ \text{time to} \\ \text{process the} \\ \text{instruction} \\ \text{at the head} \\ \text{of the execution} \\ \text{queue} \end{pmatrix} + \begin{pmatrix} \text{Estimated} \\ \text{time to} \\ \text{process a} \\ \text{given} \\ \text{waiting} \\ \text{process} \end{pmatrix} - \begin{pmatrix} \text{Acceptance} \\ \text{time} \\ \text{of the} \\ \text{waiting} \\ \text{process} \end{pmatrix}.$$

5. A method for increasing data access throughput in a tape apparatus having at least one head for writing and reading data to/from a tape medium, a drive mechanism for repositioning a tape medium along a longitudinal direction of the tape medium, and memory for storing volume management information indicating a recording position of at least one data item stored on a tape medium, said method comprising the steps of:

registering data access requests from a host device into a command queue in a sequence in which they are received;

selecting instructions stored to said command queue and placing said instructions in an execution queue;

selectively executing the data access requests registered in the command queue according to a predetermined set of rules using the volume management information;

examining each data access request stored in the execution queue to determine whether selected ones of the data access requests are late, and preferentially executing instructions which are late in a descending order such that instructions having a greater calculated value are executed prior to instructions having a lesser calculated value.

6. The method for increasing data access throughput in a tape apparatus according to claim 5, where the selective execution step selects at least two data access requests at a time from a head of the command queue, and places the selected commands in an execution queue in a sequence which will minimize the total repositioning of a tape medium.

7. The method for increasing data access throughput in a tape apparatus according to claim 5, where said selective execution step orders the data access requests stored in the execution queue such that a data access request stored in a head of said execution queue requires a minimum repositioning of a tape medium from a current position of the tape medium.

8. The method for increasing data access throughput in a tape apparatus according to claim 5, wherein a selected data access request is late if a calculated value CV is greater than a predetermined value V, where $$CV = \begin{pmatrix} \text{Current} \\ \text{time} \end{pmatrix} + \begin{pmatrix} \text{Estimated} \\ \text{time to} \\ \text{process the} \\ \text{instruction} \\ \text{at the head} \\ \text{of the execution} \\ \text{queue} \end{pmatrix} + \begin{pmatrix} \text{Estimated} \\ \text{time to} \\ \text{process a} \\ \text{given} \\ \text{waiting} \\ \text{process} \end{pmatrix} - \begin{pmatrix} \text{Acceptance} \\ \text{time} \\ \text{of the} \\ \text{waiting} \\ \text{process} \end{pmatrix}.$$

* * * * *